(12) United States Patent
Wu et al.

(10) Patent No.: US 11,353,080 B2
(45) Date of Patent: Jun. 7, 2022

(54) ANTI-FALL DEVICE

(71) Applicant: BOE Technology Group Co., Ltd., Beijing (CN)

(72) Inventors: Yunpeng Wu, Beijing (CN); Zifeng Wang, Beijing (CN); Junmin Sun, Beijing (CN); Yan Ren, Beijing (CN); Jinggang Wei, Beijing (CN); Lei Cao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 44 days.

(21) Appl. No.: 16/907,321

(22) Filed: Jun. 22, 2020

(65) Prior Publication Data

US 2021/0054896 A1 Feb. 25, 2021

(30) Foreign Application Priority Data

Aug. 23, 2019 (CN) .......................... 201921380135.X

(51) Int. Cl.
| | |
|---|---|
| *F16F 3/087* | (2006.01) |
| *F16M 13/04* | (2006.01) |
| *F16M 13/06* | (2006.01) |
| *F16H 19/04* | (2006.01) |

(52) U.S. Cl.
CPC .... *F16F 3/0876* (2013.01); *F16F 2230/0023* (2013.01); *F16F 2230/0047* (2013.01); *F16F 2230/18* (2013.01); *F16H 19/04* (2013.01); *F16M 13/04* (2013.01); *F16M 13/06* (2013.01)

(58) Field of Classification Search
CPC ............ F16F 3/0876; F16F 2230/0023; F16F 2230/0047; F16F 2230/18
See application file for complete search history.

(56) References Cited

U.S. PATENT DOCUMENTS

| | | | | |
|---|---|---|---|---|
| 7,375,645 | B2 * | 5/2008 | Tsai ...................... | G01L 5/0052 340/665 |
| 8,872,448 | B2 * | 10/2014 | Boldyrev .............. | H04M 1/185 318/129 |
| 8,896,995 | B2 * | 11/2014 | Shedletsky ............ | G06F 3/044 361/679.21 |
| 9,571,150 | B2 * | 2/2017 | Sanford ............. | H04M 1/0202 |
| 9,612,622 | B2 * | 4/2017 | Moon ...................... | H02H 7/20 |
| 2010/0164152 | A1 * | 7/2010 | Li .......................... | H04M 1/185 267/140.15 |
| 2011/0107801 | A1 * | 5/2011 | Liu .......................... | B62H 5/08 70/236 |

(Continued)

FOREIGN PATENT DOCUMENTS

CN 206878923 U 1/2018

*Primary Examiner* — Melody M Burch
(74) *Attorney, Agent, or Firm* — Ling Wu; Stephen Yang; Ling and Yang Intellectual Property

(57) ABSTRACT

An embodiment of the present application discloses an anti-fall device including a trigger mechanism, a deformable structure and a shell. The deformable structure is connected with the trigger mechanism and is set to be compressed and elastically deformed when located in the shell. The trigger mechanism is set in the shell and is configured to drive the deformable structure to move in a direction away from the trigger mechanism, so that the deformable structure pops out of the shell and recovers to a natural state from a compressed state.

17 Claims, 6 Drawing Sheets

(56) References Cited

U.S. PATENT DOCUMENTS

| | | | | |
|---|---|---|---|---|
| 2011/0127854 A1* | 6/2011 | Cruz | ............... | H02J 9/005 |
| | | | | 307/131 |
| 2013/0319882 A1* | 12/2013 | Berkovic | ............... | A45C 11/00 |
| | | | | 206/37 |
| 2014/0133072 A1* | 5/2014 | Xiaozhuo | ............... | G06F 1/1656 |
| | | | | 361/679.01 |
| 2015/0301565 A1* | 10/2015 | Manullang | ............... | G06F 1/1637 |
| | | | | 361/679.26 |
| 2017/0324852 A1* | 11/2017 | Sadai | ............... | H04M 1/0281 |
| 2020/0141084 A1* | 5/2020 | Harder | ............... | E02F 3/962 |

* cited by examiner

ANTI-FALL DEVICE

CROSS-REFERENCE TO RELATED APPLICATION

The present application claims the priority of the Chinese Patent Application No. 201921380135.X, filed to the CNIPA on Aug. 23, 2019, the content of which is hereby incorporated by reference.

TECHNICAL FIELD

The embodiments of the application relate to, but are not limited to, the field of electronic technology, in particular to an anti-fall device.

BACKGROUND

At present, in order to prevent articles from being damaged when falling from high altitude, some preventive measures are usually taken to prevent the protected articles from being damaged due to great impact force when falling. A buffer structure can be attached to the surface of the protected article to prevent the protected article from being damaged due to great impact force when falling. For example, when fragile articles are transported, plastic foam and the like will be wrapped outside the fragile articles to prevent the articles from being damaged due to impact force in the transportation process. However, this protection can only be used against shaking or shock in the normal transportation process. Once the articles fall from a height, the damage to the articles still cannot be avoided. For another example, some hand-held electronic equipments often fall off due to various reasons and accidentally fall off from high places, so that the outer shells are broken or the internal members fall off due to sudden vibration. Some anti-fall protective shells/covers are soft shells made of silicone or the like, and mainly used to wrap four corners of the electronic equipment, which can reduce the damage to the electronic equipment caused by collision after falling off to a certain extent. However, their protection ability is limited, and when the electronic equipments fall off from higher places, it is still possible to cause more serious damage.

SUMMARY

The following is a summary of the subject matter described in detail herein. This summary is not intended to limit the protection scope of the claims.

An embodiment of the present application provides an anti-fall device comprising a trigger mechanism, a deformable structure and a shell. The deformable structure is connected with the trigger mechanism and is set to be compressed and elastically deformed when it is located in the shell. The trigger mechanism is set in the shell and is configured to drive the deformable structure to move in a direction away from the trigger mechanism, so that the deformable structure pops out of the shell and recovers from a compressed state to a natural state.

Other aspects will become apparent upon reading and understanding the accompanying drawings and the detailed description.

BRIEF DESCRIPTION OF DRAWINGS

The accompanying drawings are used to provide an understanding of embodiments of the present application, form a part of the specification, and explain technical solutions of the embodiments of the present application together with embodiments of the present application, while they do not constitute a limitation on the technical solutions of embodiments of the present application.

DETAILED DESCRIPTION

In order to make the purpose, technical scheme and advantages of the embodiments of the present application clearer, the following will clearly and completely describe the technical solution of the embodiments of the present application with reference to the drawings of the embodiments of the present application. Obviously, the described embodiments are part of the embodiments of the present application, but not all of the embodiments. Based on the described embodiments of the present application, all other embodiments obtained by a person of ordinary skill in the art without creative labor are within the scope of protection of the present application.

Unless otherwise defined, technical terms or scientific terms used in the present disclosure shall have the ordinary meaning understood by those with ordinary skills in the art to which the present disclosure pertains. The words "first", "second" and the like used in the present disclosure do not represent any order, quantity or importance, but are only used to distinguish different components. Similarly, similar words such as "a", "an" or "the" do not denote a limitation on quantity, but rather denote the presence of at least one. Similar words such as "comprising" or "including" mean that the elements or articles preceding the word cover elements or articles listed after the word and their equivalents, and do not exclude other elements or articles. The wordings "connected", "connected with" or the like are not limited to physical or mechanical connections, but may include electrical connections, either directly or indirectly. "Up", "down", "left", "right" and the like only represent a relative positional relationship. After an absolute position of a described object changes, the relative positional relationship may also change accordingly.

Figure 1:
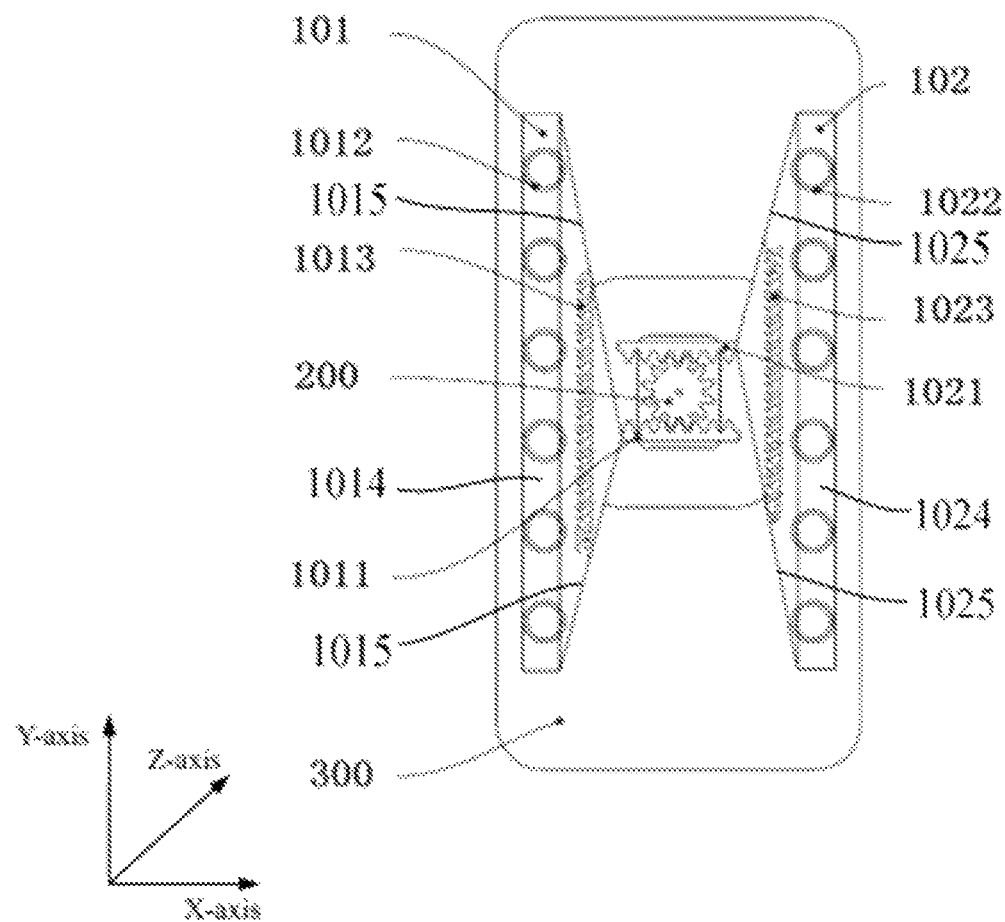
FIG. 1 is a schematic view of a deformable structure of an anti-fall device when located in a shell according to an exemplary embodiment.
Figure 7A:
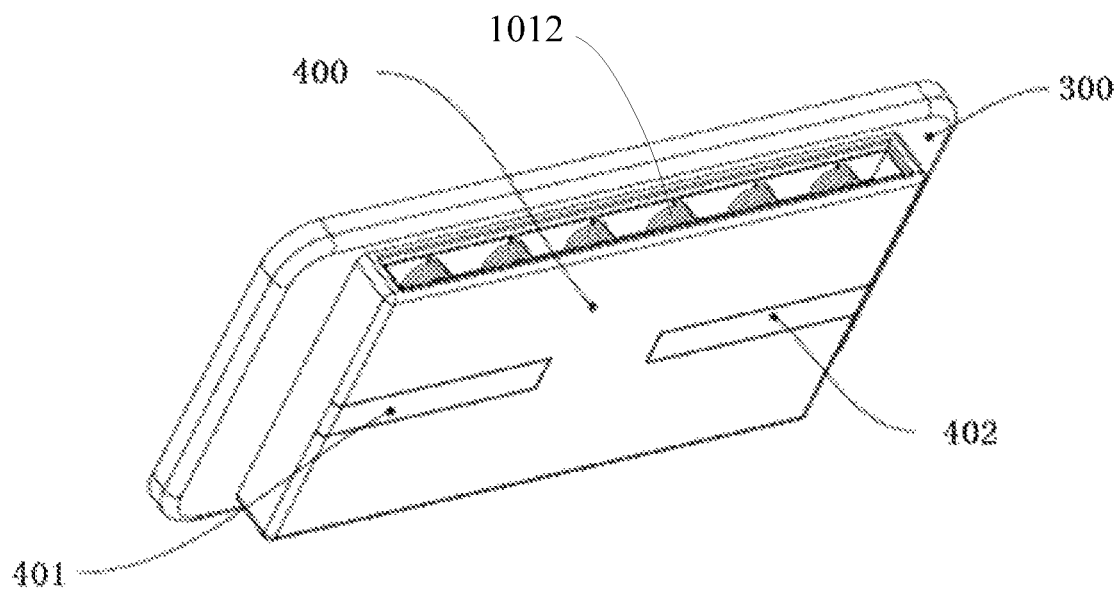
FIG. 7a is a schematic view showing the combination of an anti-fall device and a protected article according to an exemplary embodiment.
Figure 7B:
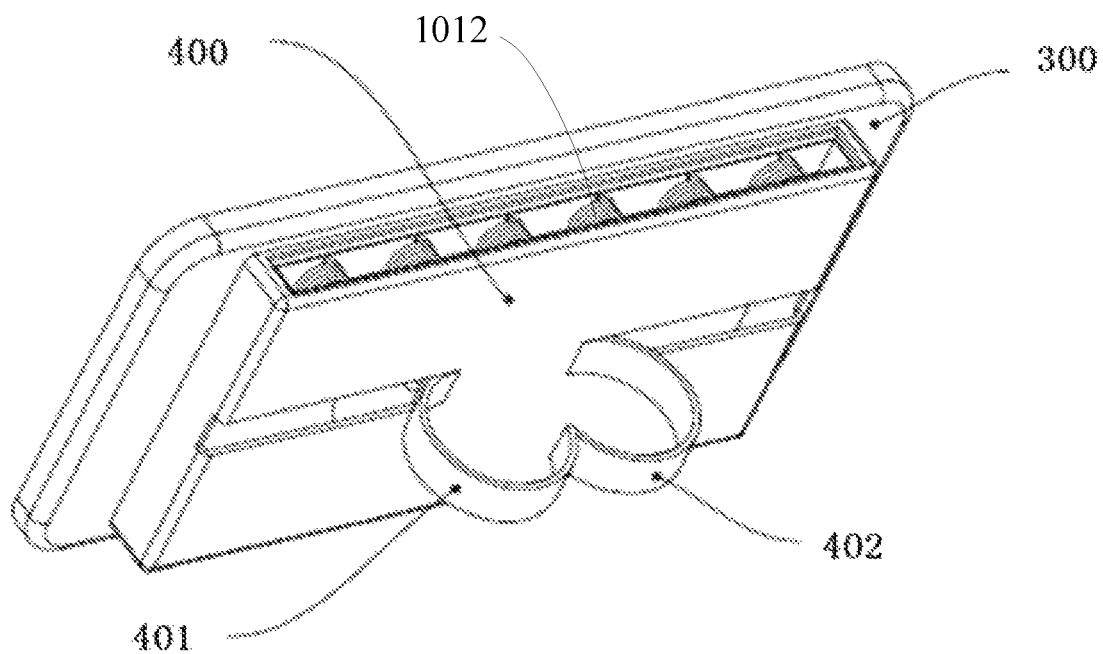
FIG. 7b is another schematic view showing the combination of an anti-fall device and a protected article according to an exemplary embodiment.
Figure 8:
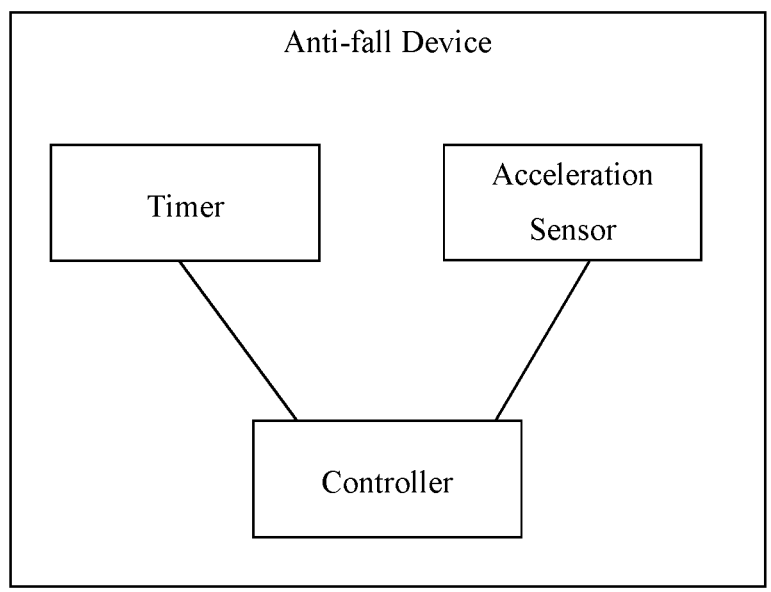
FIG. 8 is a schematic view showing an anti-fall device including a controller, an acceleration sensor and a timer according to an exemplary embodiment.

FIG. 1 is a schematic view of an anti-fall device according to an exemplary embodiment. As shown in FIG. 1, the anti-fall device comprises a trigger mechanism, a deformable structure, and a shell. For example, the trigger mechanism may comprise, for example, a gear 200, a rack 1011 and a rack 1021 as shown in FIG. 1. The deformable structure may comprise, for example, a first sub-deformable structure 101 and a second sub-deformable structure 102 as shown in FIG. 1. The first sub-deformable structure 101 may be provided with a spring 1012 and a spring 1013, and the second sub-deformable structure 102 may be provided with a spring 1022 and a spring 1023. In order to show the internal structure of the anti-fall device more clearly, the shell of the anti-fall device is not shown in FIG. 1. The shell (in some examples, the shell 400 is shown in FIGS. 7a and 7b) can be, for example, a rectangular shell with openings at both sides, so that the first sub-deformable structure 101 and the second sub-deformable structure 102 can pop out of the shell through the openings at both sides. One side surface of the shell may be connected to the surface of a protected article 300. The protected article 300 is shown in FIG. 1. The size of the shell of the anti-fall device (e.g., length, height, and thickness) may be less than or equal to the corresponding size of the protected article 300. After the deformable structure pops out of the shell, the deformable structure can exceed the size of the protected article in all directions to protect the protected article in all directions. The protected article may be, for example, an electronic product, such as a mobile phone, a tablet PC, or any article to be protected that is easy to accidentally fall off, such as packaged goods.

The deformable structure is connected with the trigger mechanism, and the deformable structure is configured to be compressed (the deformable structure may be in a compressed state due to the limitation of the shell) and elastically deformed when located in the shell. The trigger mechanism is set in the shell and is configured to drive the deformable structure to move in a direction away from the trigger mechanism, so that the deformable structure pops out of the shell and recovers from a compressed state to a natural state. While the trigger mechanism drives the deformable structure to move in a direction away from the trigger mechanism, the deformable structure gradually pops out of the shell. After the deformable structure pops out of the shell, it recovers to a natural state from a compressed state under the action of the recovering force. When the deformable structure recovers to the natural state, the deformable structure may be in a state that it is not stressed in all directions.

The anti-fall device of the embodiments of the application can be arranged on a protected article (i.e. a protected object) for use. The anti-fall device has a deformable structure which is compressed and elastically deformed when located in the shell. After being triggered by the trigger mechanism, the deformable structure can be driven by the trigger mechanism to move in a direction away from the trigger mechanism so as to pop out of the shell and recover to a natural state from the compressed state after popping out of the shell, so that the collision of the protected article can be buffered by virtue of the elasticity of the deformable structure of the anti-fall device itself when the protected article falls, which can reduce the probability of the protected article being damaged.

In an implementation, the deformable structure is set to be compressed and elastically deformed in a first direction and a second direction when located in the shell and limited by the shell in the first direction and the second direction; when the deformable structure is outside the shell, the trigger mechanism is set to drive the deformable structure to move in a direction toward the trigger mechanism until the deformable structure is inside the shell, so that the deformable structure is elastically deformed in a third direction. The first direction, the second direction and the third direction may be three directions perpendicular to each other. For example, as shown in FIG. 1, based on a spatial three-dimensional coordinate axes, the first direction and the second direction may be the Y-axis direction and the Z-axis direction of the three-dimensional coordinate axes, respectively, and the third direction may be the X-axis direction. In some examples, the first direction, the second direction, and the third direction may refer to the height direction, the thickness direction, and the length direction of the protected article 300, respectively.

In an implementation, the deformable structure may include a first sub-deformable structure and a second sub-deformable structure connected to the trigger mechanism, the trigger mechanism includes a first connection portion and a second connection portion, the first sub-deformable structure is connected to the first connection portion of the trigger mechanism, and the second sub-deformable structure is connected to the second connection portion of the trigger mechanism. Taking the anti-fall device shown in FIG. 1 as an example, the first connection portion and the second connection portion may be a first rack 1011 and a second rack 1021, respectively. The trigger mechanism may further include a gear 200. The gear 200 is connected with the first sub-deformable structure 101 and the second sub-deformable structure 102 through the first rack 1011 and the second rack 1021, respectively, so that the deformable structure of the anti-fall device can have a protective effect on the protected article 300 on both sides of the trigger mechanism after the deformable structure (in this example, the deformable structure includes a first sub-deformable structure 101 and a second sub-deformable structure 102) is recovered from a compressed state to a natural state (in some examples, some elastic members provided in the anti-fall device can be free from compressive force or tensile force when the deformable structure is in the natural state). In some examples, as shown in FIG. 1, the trigger mechanism may further include a motor (not shown) configured to drive the gear 200 to rotate, the first rack 1011 and the second rack 1021 may both be arranged parallel to the first direction (the first direction in this example is the Y-axis direction), and the first rack 1011 and the second rack 1021 are meshed with the gear 200, respectively. Under the drive of the motor, the gear 200 rotates clockwise and counterclockwise to drive the first sub-deformable structure 101 and the second sub-deformable structure 102 to be synchronously extended out of the shell and retracted into the shell.

In an implementation, as shown in FIG. 1, the first sub-deformable structure 101 may include a first elastic support bar 1014, which is a bar-shaped structure, and both ends of the first elastic support bar 1014 (both ends of the first elastic support bar 1014 in the Y-axis direction in this example) may be connected to the first connection portion (the first connection portion is the first rack 1011 in this example) of the trigger mechanism through a pair of first elastic connection portions 1015 (there may be two first elastic connection portions 1015 in this example). The second sub-deformable structure 102 may include a second elastic support bar 1024, which is a bar-shaped structure, and both ends of the second elastic support bar 1024 (both ends of the second elastic support bar 1024 in the Y-axis direction in this example) are connected to the second connection portion (the second connection portion is the second rack 1021 in this example) through a pair of second elastic connection portions 1025 (there may be two second elastic connection portions 1025 in this example). In some examples, the first elastic support bar 1014 and the second elastic support bar 1024 may be made of an elastic material (such as, but not limited to, rubber, etc.), and both the first elastic support bar 1014 and the second elastic support bar 1024 may be elastically deformed under the action of an external force. The cross-sectional shapes of the first elastic support bar 1014 and the second elastic support bar 1024 parallel to the X-axis direction may be rectangular or other shapes. The first elastic connection portion 1015 and the second elastic connection portion 1025 may both be springs, or elastic wires or elastic wedge blocks (taking the first sub-deformable structure 101 as an example, the larger end of the wedge block is connected with the first elastic support bar 1014, the smaller end of the wedge block is connected with the first rack 1011, and the surface of the wedge block may be a smooth curved surface, which may facilitate the deformable structure to be retracted into the shell). Thus, in some examples, when the first elastic support bar 1014 and the second elastic support bar 1024 are lengthened by the tensile force, or when the first elastic support bar 1014 and the second elastic support bar 1024 are lengthened by recovering from the compressed state to the natural state, the first elastic connection portion 1015 and the second elastic connection portion 1025 can be lengthened accordingly. In some examples, the first elastic support bar 1014 and the second elastic support bar 1024 may both be arranged parallel to the first direction (which may be the Y-axis direction).

Figure 2:
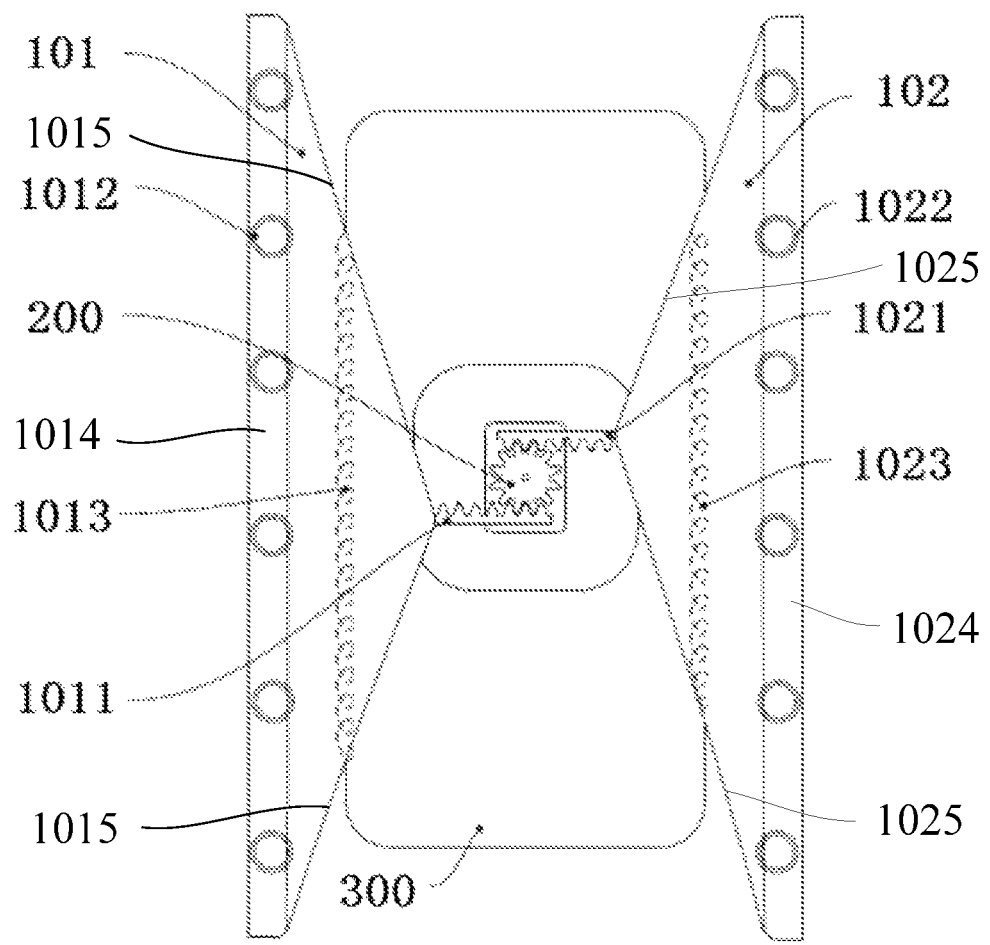
FIG. 2 is a schematic view of a deformable structure of an anti-fall device after popping out of a shell according to an exemplary embodiment.

In an implementation, a first elastic member may be connected between a pair of first elastic connection portions, and a second elastic member may be connected between a pair of second elastic connection portions. In a state where the first sub-deformable structure and the second sub-deformable structure are in the shell, both the first elastic member and the second elastic member are compressed and elastically deformed in the first direction. Taking the anti-fall device shown in FIG. 1 as an example, a spring 1013 (spring 1013 is an example of the first elastic member) and a spring 1023 (spring 1023 is an example of the second elastic member) may be respectively provided in the first sub-deformable structure 101 and the second sub-deformable structure 102. When the deformable structure (such as the first sub-deformable structure 101 and the second sub-deformable structure 102) is located in the shell, the spring 1013 and the spring 1023 are both in a compressed state and both are elastically deformed in the Y-axis direction. As shown in FIG. 2, when the deformable structure (such as the first sub-deformable structure 101 and the second sub-deformable structure 102) pops out of the shell, the spring 1013 and the spring 1023 recover to the natural state, and the first elastic support bar 1014 is stretched and lengthened under the action of the spring 1013, or the first elastic support bar 1014 is lengthened by recovering from the compressed state to the natural state under the action of the spring 1013. Similarly, the second elastic support bar 1024 will be stretched and lengthened under the action of the spring 1023, or the second elastic support bar 1024 will be lengthened by recovering from the compressed state to the natural state under the action of the spring 1023. Therefore, the length of the first elastic support bar 1014 and the second elastic support bar 1024 after being stretched or recovered to the natural state from the compressed state can be longer than the length of the protected article 300 in the Y-axis direction, so as to support and buffer the protected article 300 in the Y-axis direction after the protected article 300 falls.

Figure 3:
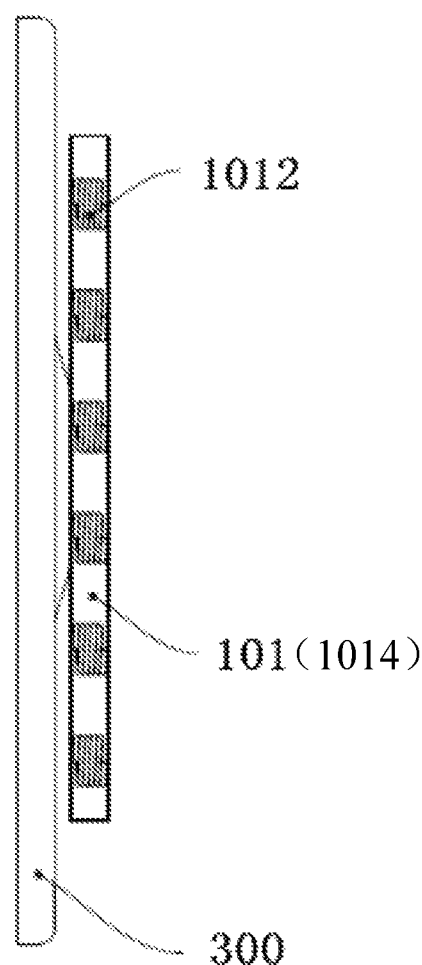
FIG. 3 is a side view of a deformable structure of an anti-fall device when located in a shell according to an exemplary embodiment.

In an implementation, as shown in FIGS. 1 and 3, the surface of the first elastic support bar 1014 may be attached with a third elastic member (in this example, the third elastic member is spring 1012), the surface of the second elastic support bar 1024 may be attached with a fourth elastic member (in this example, the fourth elastic member is spring 1022), and the third elastic member and the fourth elastic member may be respectively arranged on the first elastic support bar 1014 and the second elastic support bar 1024. In some examples, the side of the first elastic support bar 1014 remote from the trigger mechanism may be provided with a first receiving groove, the third elastic member (in this example, the third elastic member is spring 1012) may be provided in the first receiving groove, the side of the second elastic support bar 1024 remote from the trigger mechanism may be provided with a second receiving groove, and the fourth elastic member (in this example, the fourth elastic member is spring 1022) may be provided in the second receiving groove. When the first sub-deformable structure and the second sub-deformable structure are in the shell, the third elastic member and the fourth elastic member are compressed and elastically deformed in the second direction. As shown in FIG. 1, the first sub-deformable structure 101 is provided with a set of six springs 1012 in the Z-axis direction (spring 1012 is an example of the third elastic member), and the second sub-deformable structure 102 is provided with a set of six springs 1022 in the Z-axis direction (spring 1022 is an example of the fourth elastic member). The number of spring 1012 and the number of spring 1022 are not limited to six, and at least one spring 1012 and at least one spring 1022 may be provided. Six springs 1012 may be arranged in parallel and spaced apart along the first direction (the first direction is the Y-axis direction in this example), and six springs 1022 may be arranged in parallel and spaced apart along the first direction (the first direction is the Y-axis direction in this example).

Figure 4:
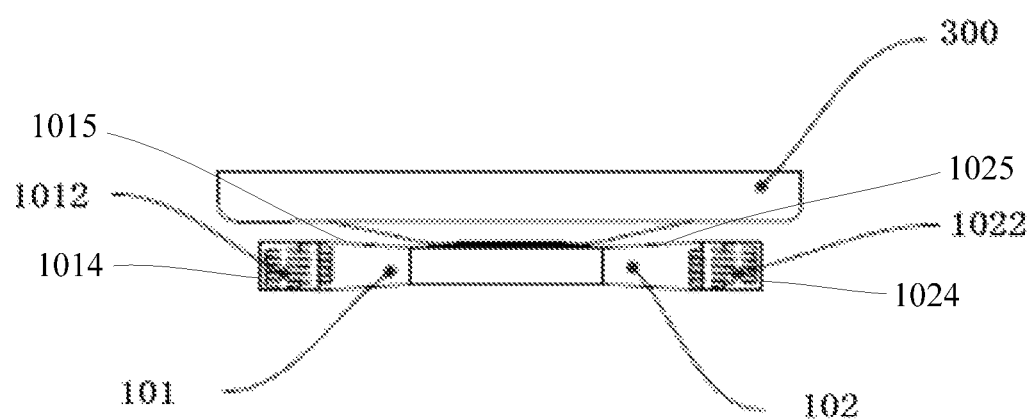
FIG. 4 is a top view of a deformable structure of an anti-fall device when located in a shell according to an exemplary embodiment.

FIG. 3 is a side view of a deformable structure of an anti-fall device in a shell according to an exemplary embodiment, and FIG. 4 is a top view of a deformable structure of an anti-fall device in a shell according to an exemplary embodiment. As shown in FIGS. 3 and 4, when the deformable structure is in the shell, the spring 1012 provided on the first sub-deformable structure 101 in the Z-axis direction and the spring 1022 provided on the second sub-deformable structure 102 in the Z-axis direction are both in a compressed state. Both the spring 1012 and the spring 1022 are elastically deformed in the Z-axis direction. While in FIGS. 2 and 5, after the deformable structure pops out of the shell, the spring 1012 and the spring 1022 recover to the natural form in the Z-axis direction. In the process that the spring 1012 and the spring 1022 recover to the natural form in the Z-axis direction, the elasticity of the spring 1012 and the spring 1022 in the Z-axis direction can respectively make the first elastic support bar 1014 and the second elastic support bar 1024 stretch or recover to the natural state in the Z-axis direction, and the sizes of the first elastic support bar 1014 and the second elastic support bar 1024 become larger in the Z-axis direction and can both exceed beyond the opposite surfaces of the protected article 300, so that when the protected article 300 falls, the protected article 300 can be supported and buffered in the Z-axis direction.

Figure 5:
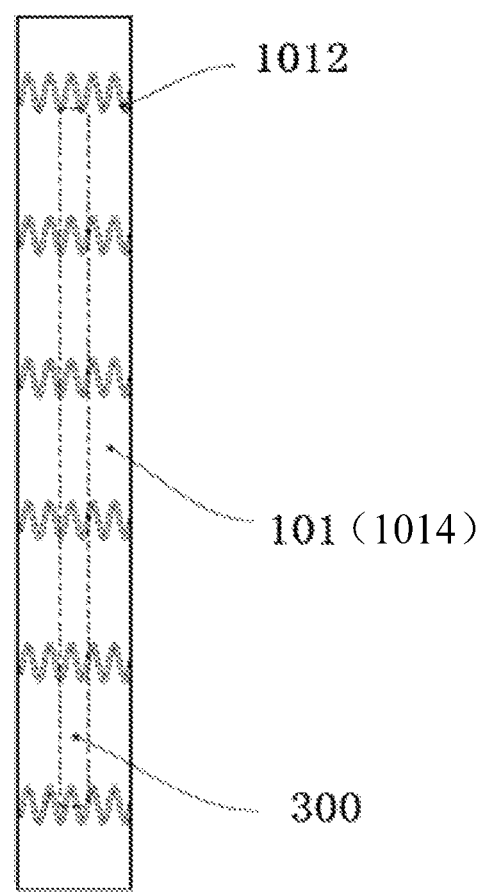
FIG. 5 is a side view of a deformable structure of an anti-fall device in a state after popping out of a shell according to an exemplary embodiment.
Figure 6:
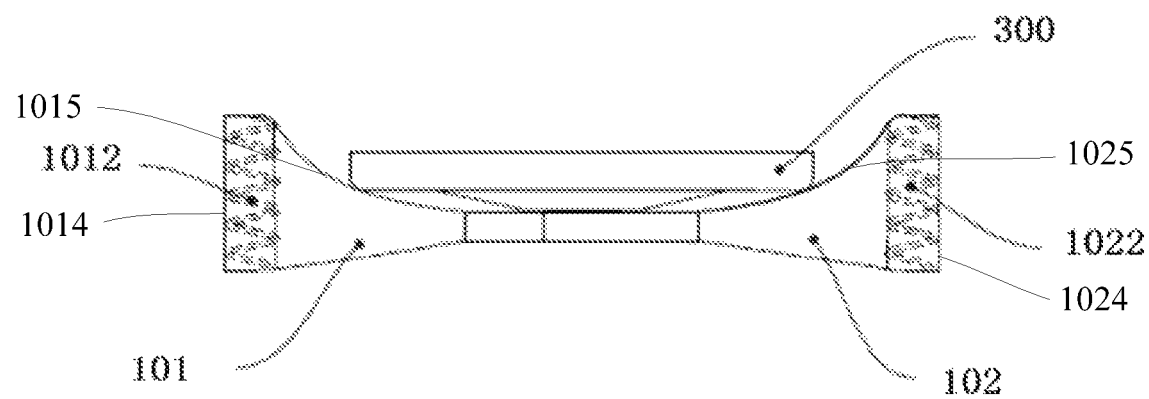
FIG. 6 is a top view of a deformable structure of an anti-fall device in a state after popping out of a shell according to an exemplary embodiment.

In an implementation, the trigger mechanism may further include a gear, and the first connection portion and the second connection portion are a first rack and a second rack respectively engaged with the gear. Still taking the anti-fall device shown in FIG. 1 as an example, the first sub-deformable structure 101 is connected to the gear 200 through the first rack 1011, the second sub-deformable structure 102 is connected to the gear 200 through the second rack 1021, and the first rack 1011 and the second rack 1021 are arranged in parallel. When the gear 200 is driven to rotate by a drive system, the first rack 1011 can move in a direction toward or away from the gear 200 (X-axis direction in this example), thereby driving the first sub-deformable structure 101 to move in a direction toward or away from the gear 200, and the second rack 1021 can move in a direction toward or away from the gear 200 (X-axis direction in this example), thereby driving the second sub-deformable structure 102 to move in a direction toward or away from the gear 200. Since the first rack 1011 and the second rack 1021 are respectively connected to the opposite positions of the gear 200, and the first rack 1011 and the second rack 1021 are respectively located on opposite sides of the gear 200, after the gear 200 rotates, the first rack 1011 and the second rack 1021 can simultaneously move in a direction away from the gear 200 or move in a direction toward the gear 200. While the first sub-deformable structure 101 and the second sub-deformable structure 102 move in a direction toward the gear 200 simultaneously, the deformable structure as a whole is gradually compressed until it is retracted into the shell. In the process that the first sub-deformable structure 101 and the second sub-deformable structure 102 move in a direction away from the gear 200 simultaneously, first, the first sub-deformable structure 101 and the second sub-deformable structure 102 gradually move out of the shell, so that the first sub-deformable structure 101 and the second sub-deformable structure 102 are no longer constrained by the shell in the Y-axis and Z-axis directions, and the elastic members (such as spring 1012 and spring 1013, and spring 1022 and spring 1023) of the first sub-deformable structure 101 and the second sub-deformable structure 102 disposed in the Z-axis and the Y-axis are recovered from the compressed state to the natural state due to the recovering force. FIG. 5 is a side view of a deformable structure of an anti-fall device in a state after popping out of a shell according to an exemplary embodiment. FIG. 6 is a top view of a deformable structure of an anti-fall device in a state after popping out of a shell according to an exemplary embodiment. As shown in FIGS. 5 and 6, in some exemplary embodiments, a set of springs 1012 of the first sub-deformable structure 101 arranged in the Z-axis and a set of springs 1022 of the second sub-deformable structure 102 arranged in the Z-axis are in a naturally expanded state (i.e., a natural state) in the Z-axis direction. The length of each spring (spring 1012 and spring 1022) of the set of springs in the naturally expanded state is greater than the thickness of the protected article 300 in the Z-axis direction. Meanwhile, since the first sub-deformable structure 101 and the second sub-deformable structure 102 are in the expanded state in the X-axis direction, the length of the first sub-deformable structure 101 and the second sub-deformable structure 102 after being expanded is greater than the length of the protected article 300 in the X-axis, and the height of the first sub-deformable structure 101 and the second sub-deformable structure 102 in the Y-axis after being expanded is greater than the height of the protected article 300 in the Y-axis. Therefore, the first sub-deformable structure 101 and the second sub-deformable structure 102 of the anti-fall device can play a supporting or buffering role in all of the X-axis, Y-axis and Z-axis directions, thereby protecting the protected article 300 in multiple directions.

In an implementation, the anti-fall device is used for being arranged on the protected object. The anti-fall device may further comprise a controller, the trigger mechanism is connected with an output end of the controller. The controller is configured to control the trigger mechanism to drive the deformable structure to move in a direction away from the trigger mechanism, or to drive the deformable structure to move in a direction toward the trigger mechanism according to the acceleration of the protected object. Still taking the anti-fall device shown in FIG. 1 as an example, a rotation shaft of the gear 200 in the trigger mechanism can be connected to the output end of the controller through a motor, so that the controller can send a control signal to the motor so as to control the motor to drive the gear to rotate clockwise or counterclockwise. For example, when the controller acquires that the acceleration value of the protected object 300 is greater than a first threshold value, it can be confirmed that the protected object 300 is in a falling state, the controller can send a control signal to the motor of the trigger mechanism, and the central gear 200 of the trigger mechanism rotates clockwise by a preset angle under the drive of the motor when the motor receives the control signal. For example, the central gear 200 rotates clockwise by half a turn so as to drive the deformable structure (the deformable structure in this example comprises the first sub-deformable structure 101 and the second sub-deformable structure 102) to move in a direction away from the trigger mechanism, the rack 1011 and the rack 1021 matched with opposite sides of the central gear 200 move linearly toward opposite sides (the two opposite directions along the X-axis in this example) respectively, gradually pushing the first sub-deformable structure 101 and the second sub-deformable structure 102 out of the shell 400. Since the first sub-deformable structure 101 and the second sub-deformable structure 102 may freely deform themselves, the spring 1012 and the spring 1022 in the Z-axis direction, and the spring 1013 and the spring 1023 in the Y-axis direction within the deformable structure are all extended to recover the original state after popping out of the shell 400. When the protected article 300 has landed stably (for example, when the controller acquires that the acceleration value of the protected object 300 returns to zero after falling, it can be confirmed that the protected article 300 has landed stably), the controller can send a control signal to the motor of the trigger mechanism, and the gear 200 in the trigger mechanism is driven by the motor after receiving the signal to rotate counterclockwise by a preset angle, for example, rotate counterclockwise for half a turn. The matched rack 1011 and rack 1021 are driven to move linearly toward the inside of the shell. The deformable structure can be retracted into the shell 400 (shown in FIGS. 7a and 7b) according to its curved wedge shape, all springs are compressed, and the whole anti-fall device returns to the retracted state as shown in FIGS. 1 to 3.

In an implementation, the anti-fall device may further include an acceleration sensor connected to an input end of the controller. The acceleration sensor is configured to detect the gravity acceleration of the protected object and send the detected gravity acceleration to the controller, so that the controller can control the trigger mechanism to drive the deformable structure to move toward or away from the trigger mechanism according to the gravity acceleration of the protected object, thereby controlling the anti-fall device to be opened or retracted, and further realizing the purposes of controlling the anti-fall device to be opened when the protected object falls to protect the protected object and controlling the anti-fall device to be retracted after the protected object has landed stably.

In an implementation, the anti-fall device may further include a timer connected to the controller, the timer being configured to start timing when receiving a start signal sent by the controller and send a recorded time signal to the controller. The controller is further configured to control the trigger mechanism to drive the deformable structure to move in a direction away from the trigger mechanism or to drive the deformable structure to move in a direction toward the trigger mechanism according to the time signal. In some examples, the trigger conditions under which the trigger mechanism is triggered to drive the deformable structure to move toward or away from the trigger mechanism may include: 1) fall judgment: when the measured acceleration $a=9.8\pm0.1$ m/s² and the duration $t \geq t_0$, the trigger mechanism is triggered to drive the deformable structure to move in a direction away from the trigger mechanism, then the deformable structure pops out of the shell. Herein t is the response time of the acceleration sensor, that is, the time recorded by the timer, and $t_0$ is the preset time. In some examples, $t_0$ may not exceed 0.63 s when the threshold of the fall judgment is set to be 2 m from the ground; if it is set to fall from 1 m above the ground, $t_0$ may not exceed 0.45 s; if it is set to fall from 0.5 m above the ground, $t_0$ may not exceed 0.31 s; 2) landing judgment: when the measured acceleration $a \leq 0.1$ m/s² and the duration $t \geq 1$ s, the trigger mechanism is triggered to drive the deformable structure to move in a direction toward the trigger mechanism, then the deformable structure is retracted into the shell.

In an implementation, the deformable structure may be made of an elastic material. For example, as shown in FIG. 1, the first sub-deformable structure 101, the second sub-deformable structure 102, and the elastic members disposed in the Y-axis and Z-axis directions of the first sub-deformable structure 101 and the second sub-deformable structure 102 may all be made of an elastic material, and the elastic material may be any one of memory cotton, memory silicone, and memory metal, for example.

In an implementation, as shown in FIGS. 7a and 7b, the shell 400 of the anti-fall device may be arranged on the protected object 300, and the surface of the shell 400 may be provided with a connection structure for connecting with the protected object 300. For example, the surface of the shell 400 may be provided with an adhesive structure, such as double-sided adhesive tape. Based on the adhesive structure, the anti-fall device may be adhered to the surface of the protected article 300. For another example, the surface of the shell 400 may have a groove for receiving the protected article 300. For another example, the surface of the shell 400 may have a buckle or a gripper for fixing the protected article 300.

In an implementation, the surface of the shell is provided with at least one foldable strip structure configured to attach tightly to the surface of the shell when in an unfolded state, and form a ring structure when in a folded state. For example, FIG. 7a is a schematic view showing the combination of an anti-fall device and a protected article. As shown in FIG. 7a, the surface of the protected article 300 is combined with a surface of one side of the shell 400 of the anti-fall device, and the other side of the shell 400 of the anti-fall device is provided with two strip structures 401 and 402 which are structurally symmetrical to each other. In FIG. 7a, the strip structure 401 and the strip structure 402 are in an unfolded state. In the unfolded state, the strip structure 401 and the strip structure 402 can be on the same horizontal plane as the shell 400, so the strip structure 401 and the strip structure 402 can be flattened and tightly attached to the shell 400 at ordinary times. For example, when pulled outward, the strip structure 401 and the strip structure 402 are curled and supported by the self-elasticity to form a structure as shown in FIG. 7b, and the structure can function as a handle or a bracket of the protected article 300.

It should be noted that in the drawings, the dimensions of layers and regions may be exaggerated for clarity of illustration. Also, it will be understood that when an element or layer is referred to as being "on" another element or layer, it may be directly on the other element, or there may be an intermediate layer. In addition, it is understood that when an element or layer is referred to as being "under" another element or layer, it may be directly under the other element, or there may be more than one intermediate layer or element. In addition, it is also understood that when a layer or element is referred to as being "between" two layers or two elements, it may be the only layer between the two layers or the two elements, or there may be more than one intermediate layer or element. Similar reference numerals refer to similar elements throughout the application.

Herein, the terms "first", "second", "third" and "fourth" are used for description purposes only, and cannot be interpreted as indicating or implying relative importance. The term "a plurality of" refers to two or more unless explicitly defined otherwise.

One of ordinary skill in the art to which the present application pertains should understand that the above description is only a part of the embodiments of the present application and is not intended to limit the technical solution of the present application. Any amendment, equivalent substitution, improvement and the like made within the spirit and principles of the embodiments of the present application shall be included in the scope of protection of the present application.

What we claim is:

1. An anti-fall device comprising:
a trigger mechanism, a deformable structure and a shell;
wherein the deformable structure is connected with the trigger mechanism, the deformable structure is set to be compressed and elastically deformed when it is located in the shell, and the trigger mechanism is set in the shell and is configured to drive the deformable structure to move in a direction away from the trigger mechanism to make the deformable structure pop out of the shell and recover from a compressed state to a natural state;
wherein the deformable structure is set to be compressed and elastically deformed in a first direction and a second direction when it is located in the shell and limited by the shell in the first direction and the second direction;
the trigger mechanism is set to drive the deformable structure to move in a direction toward the trigger mechanism when the deformable structure is located outside the shell until the deformable structure is located in the shell, to make the deformable structure be elastically deformed in a third direction;
the first direction, the second direction, and the third direction cross each other;
the deformable structure comprises a first sub-deformable structure and a second sub-deformable structure connected to the trigger mechanism, the trigger mechanism comprises a first connection portion and a second connection portion, the trigger mechanism is connected with the first sub-deformable structure through the first connection portion and is connected with the second sub-deformable structure through the second connection portion;

wherein the first sub-deformable structure comprises a first elastic support bar, both ends of the first elastic support bar are connected with the first connection portion through a pair of first elastic connection portions, the second sub-deformable structure comprises a second elastic support bar, and both ends of the second elastic support bar are connected with the second connection portion through a pair of second elastic connection portions.

2. The anti-fall device according to claim 1, wherein the first direction, the second direction, and the third direction are perpendicular to each other.

3. The anti-fall device according to claim 1, wherein the trigger mechanism further comprises a gear, the first connection portion and the second connection portion respectively correspond to a first rack and a second rack engaged with the gear, and the first rack and the second rack are arranged in parallel.

4. The anti-fall device according to claim 3, wherein the trigger mechanism further comprises a motor configured to drive the gear to rotate, and the first rack and the second rack are both arranged parallel to the first direction.

5. The anti-fall device according to claim 1, wherein a first elastic member is connected between the pair of first elastic connection portions, and a second elastic member is connected between the pair of second elastic connection portions, and both the first elastic member and the second elastic member are configured to be compressed and elastically deformed in the first direction when the first sub-deformable structure and the second sub-deformable structure are in the shell.

6. The anti-fall device according to claim 5, wherein both the first elastic member and the second elastic member are springs.

7. The anti-fall device according to claim 1, wherein the first elastic support bar and the second elastic support bar are both arranged parallel to the first direction.

8. The anti-fall device according to claim 1, wherein the first elastic support bar is provided with a third elastic member, the second elastic support bar is provided with a fourth elastic member, and both the third elastic member and the fourth elastic member are set to be compressed and elastically deformed in the second direction when the first sub-deformable structure and the second sub-deformable structure are in the shell.

9. The anti-fall device according to claim 8, wherein a side of the first elastic support bar remote from the trigger mechanism is provided with a first receiving groove, the third elastic member is provided in the first receiving groove, a side of the second elastic support bar remote from the trigger mechanism is provided with a second receiving groove, and the fourth elastic member is provided in the second receiving groove.

10. The anti-fall device according to claim 8, wherein the third elastic member comprises a plurality of third springs arranged in parallel and spaced apart along the first direction, and the fourth elastic member comprises a plurality of fourth springs arranged in parallel and spaced apart along the first direction.

11. The anti-fall device according to claim 1, wherein the anti-fall device is configured to be arranged on a protected object, and further comprises a controller, wherein the trigger mechanism is connected with an output end of the controller, and the controller is configured to control the trigger mechanism to drive the deformable structure to move in a direction away from the trigger mechanism or to drive the deformable structure to move in a direction toward the trigger mechanism according to an acceleration of the protected object.

12. The anti-fall device according to claim 11, further comprising:

an acceleration sensor connected to an input end of the controller, the acceleration sensor being configured to detect acceleration of the protected object and send a detected acceleration signal to the controller.

13. The anti-fall device according to claim 12, further comprising:

a timer connected to the controller, wherein the timer is configured to start timing when receiving a start signal sent by the controller and to send a recorded time signal to the controller;

the controller is further configured to control the trigger mechanism to drive the deformable structure to move in a direction away from the trigger mechanism or to drive the deformable structure to move in a direction toward the trigger mechanism according to the time signal.

14. The anti-fall device according to claim 1, wherein the deformable structure is made of an elastic material.

15. The anti-fall device according to claim 1, wherein a surface of the shell is provided with at least one foldable strip structure, and the at least one foldable strip structure is configured to attach to the surface of the shell when in an unfolded state and form a ring structure when in a folded state.

16. The anti-fall device according to claim 1, wherein the shell is configured to be provided on a protected object, and a surface of the shell is provided with a groove for receiving the protected object.

17. The anti-fall device according to claim 1, wherein the shell is configured to be provided on a protected object, and a surface of the shell is provided with a connection structure for connecting with the protected object.

* * * * *